A. JACK.
Method and Apparatus for Dyeing Wool on Sheep-Skins.
No. 160,677. Patented March 9, 1875.
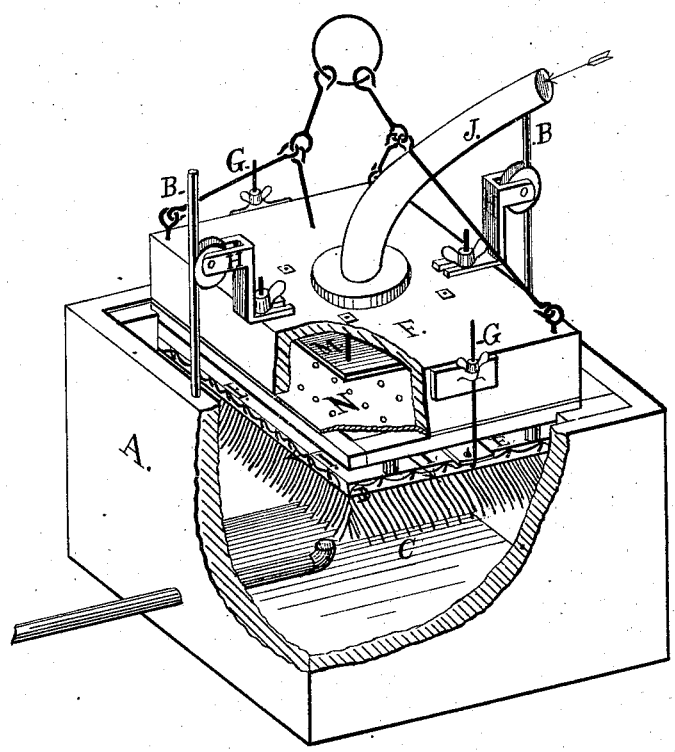
Witnesses
L. Conlan.
M. A. Atherton
Inventor
Alexander Jack
by Abel T. Atherton
his Atty.

UNITED STATES PATENT OFFICE.

ALEXANDER JACK, OF BARNET, VERMONT.

IMPROVEMENT IN METHODS AND APPARATUS FOR DYEING WOOL ON SHEEP-SKINS.

Specification forming part of Letters Patent No. 160,677, dated March 9, 1875; application filed December 11, 1874.

*To all whom it may concern:*

Be it known that I, ALEXANDER JACK, of Barnet, in the county of Caledonia and State of Vermont, have invented certain Improvements in the Method and Apparatus for Dyeing the Wool on Sheep-Skins, of which the following is a specification:

My invention consists in an improved apparatus for dyeing the wool on sheep-skins, whereby the skin is kept perfectly cool during the operation of dyeing, thus preventing the skin from being injured, and at the same time there is no danger of cooling the dyeing-liquor. My invention also consists in an improved device whereby the apparatus, and consequently the skin attached to the same, is always kept in the right position, so that the wool on the skin can be dyed a number of different colors during one operation.

The accompanying drawing represents my invention.

A is a vat containing the dye-liquor. B B are the guide-rods attached to the vat A, which serve to keep the apparatus, to which the skin is attached, in the right position. C is the wool of the skin after being dyed. D is a strip of cloth hooked on points, and to which the skin is sewed. E is a frame which is attached to the air-chamber. F is the air-chamber. G G are the clamps, by means of which the frame containing the skin is attached to the air-chamber. H H are the brackets attached to the air-chamber E containing guide-pulleys, which operate in connection with the guide-rods B B attached to the vat A. I is the space for the escape of the air after being used in cooling the skin. J is a flexible air-tube to convey the air to the air-chamber. M is a metal plate to break the force of the wind upon the center of the air-chamber, so that the air in the chamber will be of uniform density, and be distributed evenly through the perforated plate upon the skin. The skin upon which is the wool to be dyed is first sewed to the cloth D, and then hooked to the points. The air is then forced into the air-chamber, the wool is lowered and raised a few times in the dye-liquor until the same is sufficiently colored, after which it is removed from the dye-liquor. By means of the air admitted to the skin, the same is always kept cool, and prevented from being injured on account of coming in contact with the hot steam of the dye-liquor, so that it is unnecessary to remove the skin from the vat until the wool is dyed. By the escape of the air without coming in contact with the dye-liquor no trouble arises in consequence of cooling the liquor.

By the methods commonly in use but one immersion in the dye-liquor is permitted before taking the skin from the vat and cooling. It is then returned to the vat and once again immersed in the dye-liquor, and again removed from the vat, and this operation is continued until the wool on the skin is dyed. This method of dyeing is necessary in the processes commonly employed in order to prevent the skin from being injured by being too long a time in contact with the heat from the dye-liquor.

By means of the guides B B on the vat, and the pulley-brackets H H on the air-chamber, the latter, and consequently the skins attached to it, are always kept in uniform position in relation to the former, so that, instead of one vat containing only one color of dyeing-liquor, several vats, containing different colors of dyeing-liquors, may be used to receive the air-chamber in succession, and the skins thereon be dyed accordingly.

I claim as my invention—

1. An air-chamber, F, constructed and operating substantially as described, in combination with a dye-vat, A, for dying wool on the skins, as herein specified.

2. The combination of guide-brackets and pulleys H H on the air-chamber, with guide-rods B B on the vat, substantially as and for the purpose herein specified.

ALEXANDER JACK.

Witnesses:
    A. SCOTT LAUGHLIN,
    SAML. BRICE.